US010063796B2

(12) United States Patent
Lule et al.

(10) Patent No.: US 10,063,796 B2
(45) Date of Patent: Aug. 28, 2018

(54) SENSING PIXEL HAVING SAMPLING CIRCUITRY TO SAMPLE PHOTODIODE SIGNAL MULTIPLE TIMES BEFORE RESET OF PHOTODIODE

(71) Applicant: STMicroelectronics (Grenoble 2) SAS, Grenoble (FR)

(72) Inventors: Tarek Lule, Saint-Egreve (FR); Benoit Deschamps, Sassenage (FR); Jerome Chossat, Voiron (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 238 days.

(21) Appl. No.: 15/088,641

(22) Filed: Apr. 1, 2016

(65) Prior Publication Data

US 2017/0289473 A1 Oct. 5, 2017

(51) Int. Cl.
*H04N 5/353* (2011.01)
*H04N 5/372* (2011.01)
*H04N 5/378* (2011.01)

(52) U.S. Cl.
CPC .......... *H04N 5/3535* (2013.01); *H04N 5/372* (2013.01); *H04N 5/378* (2013.01)

(58) Field of Classification Search
CPC ...... H04N 5/3535; H04N 5/372; H04N 5/353; H04N 5/378
USPC ........................................... 250/208.1, 214.1
See application file for complete search history.

(56) References Cited

U.S. PATENT DOCUMENTS

| 7,286,174 | B1 | 10/2007 | Weale et al. |
| 7,697,051 | B2* | 4/2010 | Krymski ........... H01L 27/14609 |
| | | | 250/208.1 |
| 7,772,536 | B2 | 8/2010 | Yamada et al. |
| 8,853,755 | B2 | 10/2014 | Barbier et al. |
| 9,118,883 | B2* | 8/2015 | Wan ....................... H04N 5/765 |
| 2013/0009041 | A1 | 1/2013 | Barbier et al. |
| 2014/0008520 | A1 | 1/2014 | Raynor |

OTHER PUBLICATIONS

Solhusvik, Johannes, et al: "A Comparison of High Dynamic Range CIS Technologies for Automotive Applications," OmniVision Technologies, 2013 (4 pages).

* cited by examiner

*Primary Examiner* — Seung C Sohn
(74) *Attorney, Agent, or Firm* — Crowe & Dunlevy (57) ABSTRACT

An electronic device disclosed herein includes a photodiode, and a plurality of storage components each configured to independently sample and hold charges from the photodiode during each of a plurality of integration periods without discharging the held charge between successive integration periods of the plurality thereof. Each storage component accumulates the charges from the photodiode for a given time window during each integration period, with the given time window for each storage component being different than the given time window for each other storage component. Readout circuitry is configured to transfer the charges from each storage component to a readout node in a respective read period for that storage component. The photodiodes and storage components are not configured to be reset between successive time windows during each integration period.

33 Claims, 5 Drawing Sheets

SENSING PIXEL HAVING SAMPLING CIRCUITRY TO SAMPLE PHOTODIODE SIGNAL MULTIPLE TIMES BEFORE RESET OF PHOTODIODE

TECHNICAL FIELD

This application is directed to the field of light sensing pixels, and, more particularly, to a light sensing pixel having sampling circuitry that samples a photodiode signal multiple times before resetting the photodiode as to provide for enhanced performance over conventional light sensing pixels.

BACKGROUND

Arrays of light sensing pixels are widely used in digital camera sensors, which are incorporated into devices such as automobiles and smartphones. In some applications, such a digital camera sensor may be instructed to acquire images, and the field of view represented by those images may include lighting delivered by light emitting diodes (LEDs).

LEDs typically operate by emitting discrete pulses of light in accordance with a duty cycle. This may create an issue with properly representing the shape and color of the light emitted by the LEDs, if the acquisition time of the digital camera sensor is not synchronized with the duty cycle of the LEDs. That is, a LED may be in an "off" portion of its duty cycle while the digital camera sensor is acquiring an image, or may be transitioning between "off" and "on", or between "on" and "off", while the digital camera sensor is acquiring the image.

This can be particularly problematic in cases where another electronic device relies upon images captured by a digital camera sensor in taking other actions. For example, in certain automotive applications, a vehicle may autonomously take an action based upon an illuminated color of a traffic light captured by a digital image sensor, or may present information to a driver based upon the illuminated color of the traffic light. Since an issue with the image captured by the digital camera sensor may thus result in an incorrect autonomous action or in incorrect information being presented to the user, there is a strong commercial desire for improved light sensing pixels capable of properly representing light from emitted LEDs.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An electronic device disclosed herein includes a photodiode, and a plurality of storage components each configured to independently sample and hold charges from the photodiode during each of a plurality of integration periods without discharging the held charge between successive integration periods of the plurality thereof. Each storage component accumulates the charges from the photodiode for a given time window during each integration period, with the given time window for each storage component being different than the given time window for each other storage component. Readout circuitry is configured to transfer the charges from each storage component to a readout node in a respective read period for that storage component. The photodiodes and storage components are not configured to be reset between successive time windows during each integration period.

Another aspect is directed to an electronic device including a photodiode, and a first storage component configured to sample and hold voltage from the photodiode during a first sample window of each of a plurality of integration periods. A second storage component is configured to sample and hold voltage from the photodiode during a second sample window of each of the plurality of integration periods. A third storage component is configured to sample and hold voltage from the photodiode during a third sample window of each of the plurality of integration periods. The third sample window is greater in duration than the second sample window which is greater in duration than the first sample window. The first, second, and third sample windows are non-overlapping.

Readout circuitry is configured to transfer voltage from the first storage component to a storage node during a first read period, transfer voltage from the second storage component to the storage node during a second read period, and transfer voltage from the third storage component to the storage node during a third read period. The photodiode is not configured to be reset between the first, second, and third sample windows. The storage node is configured to be reset between each read period.

A further aspect is directed to electronic device including a photodiode having an anode coupled to a reference node and a cathode coupled to a first node. A photodiode reset transistor has a drain coupled to a power supply node, a source coupled to the first node, and a gate coupled to receive a photodiode reset signal. A first sample transistor has a source coupled to the first node, a drain coupled to a first intermediate node, and a gate coupled to receive a first sample/hold signal. A second sample transistor has a source coupled to the first node, a drain coupled to a second intermediate node, and a gate coupled to receive a second sample/hold signal. A third sample transistor has a source coupled to the first node, a drain coupled to a third intermediate node, and a gate coupled to receive a third sample/hold signal. First, second, and third storage capacitors are respectively coupled between the first, second, and third intermediate nodes and the reference node. A first transfer gate transistor has a source coupled to the first intermediate node, a drain coupled to a sensing node, and a gate coupled to receive a first read control signal. A first reset transistor has a drain coupled to the power supply node, a source coupled to the sensing node, and a gate coupled to receive a reset signal. A first source follower transistor has a drain coupled to the power supply node, a source coupled to a first follower node, and a gate coupled to the sensing node. A first read transistor has a drain coupled to the first follower node, a source coupled to a first column, and a gate coupled to receive a read signal.

A method aspect is directed to a method including allowing light to impinge upon a photodiode for an exposure period, and integrating a signal from the photodiode over multiple integration periods during the exposure period, with each integration period having a plurality of sub-periods, wherein successive sub-periods during each integration period are longer than preceding sub-periods during that integration period. The method also includes sampling and holding the signal during each sub-period of each integration period over the exposure period, using a respective storage device for each sub-period, and for each storage device, reading a voltage associated with that storage device during a respective read period associated with that storage device, after passage of the multiple integration periods.

DETAILED DESCRIPTION

In the following description, numerous details are set forth to provide an understanding of the present disclosure. It will be understood by those skilled in the art, however, that the embodiments of the present disclosure may be practiced without these details and that numerous variations or modifications from the described embodiments may be possible.

Figure 1:
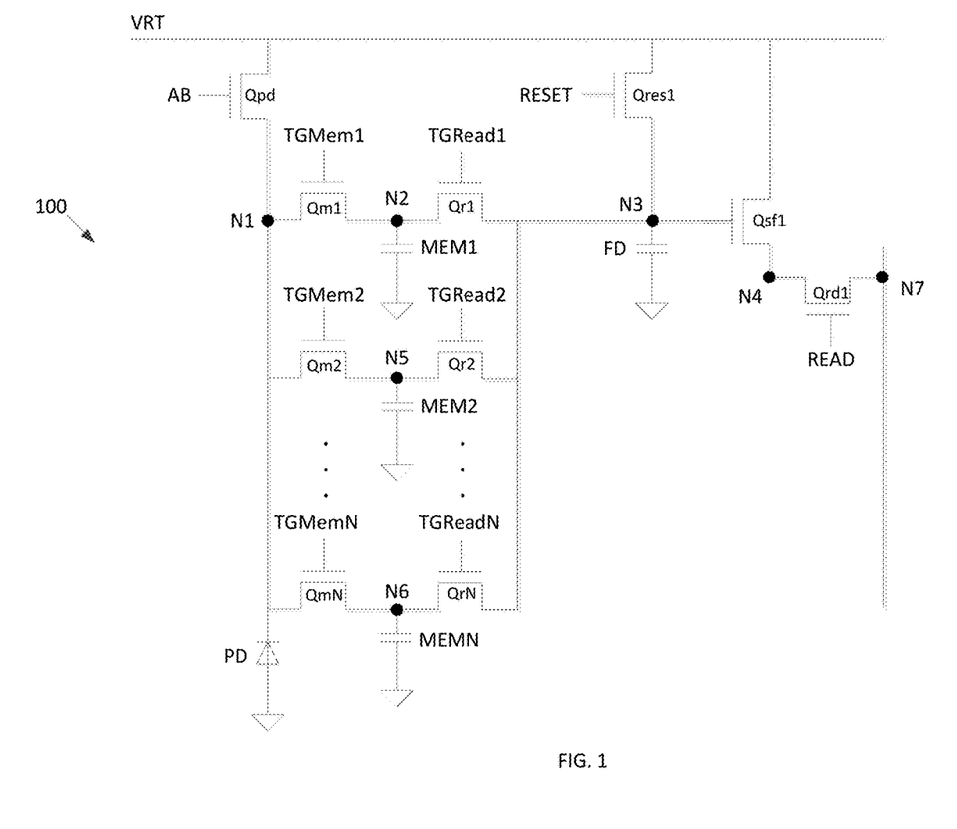
FIG. 1 is a schematic diagram of a light sensing pixel in accordance with this disclosure.

With initial reference to FIG. 1, a light sensing pixel 100 is now described. The light sensing pixel 100 includes a photodiode PD coupled between a reference node and node N1. A photodiode reset transistor Qpd has its drain coupled to a power source node VRT, its source coupled to node N1, and its gate coupled to a photodiode reset signal AB.

Sample transistor Qm1 has its source coupled to node N1, its drain coupled to node N2, and its gate coupled to sample/hold signal TGMem1. Transfer gate transistor Qr1 has its drain coupled to node N2, its source coupled to node N3, and its gate coupled to read control signal TGRead1. Memory capacitor MEM1 is coupled between node N2 and the reference node.

Sample transistor Qm2 has its source coupled to node N1, its drain coupled to node N5, and its gate coupled to sample/hold signal TGMem2. Transfer gate transistor Qt2 has its drain coupled to node N5, its source coupled to node N3, and its gate coupled to read control signal TGRead2. Memory capacitor MEM2 is coupled between node N5 and the reference node.

As should be appreciated, there may be any number of sample transistors QmN and transfer gate transistors QrN.

A floating diffusion capacitor FD is shown coupled between node N3 and the reference node, and represents the sum of parasitic capacitances in the circuit. Reset transistor Qres1 has its drain coupled to the power supply node VRT, its source coupled to node N3, and its gate coupled to receive the reset signal RESET.

A source follower transistor Qsf1 has its drain coupled to the power supply node VRT, its source coupled to node N4, and its gate coupled to node N3.

A readout transistor Qrd1 has its drain coupled to node N4, its source coupled to node N7, and its gate coupled to the read signal READ.

Operation of the light sensing pixel 100 will now be described with additional reference to FIGS. 2-3. After the photodiode reset signal AB is pulsed, the photodiode PD begins to detect light during an exposure period that is between successive assertions of the photodiode reset signal AB. The photodiode PD is integrated over X integration periods (as shown in FIG. 2, here there are two integration periods), and each integration period is split into Y integration sub-periods periods (as shown in FIG. 2, here each integration period is split into three integration sub-periods).

Figure 2:
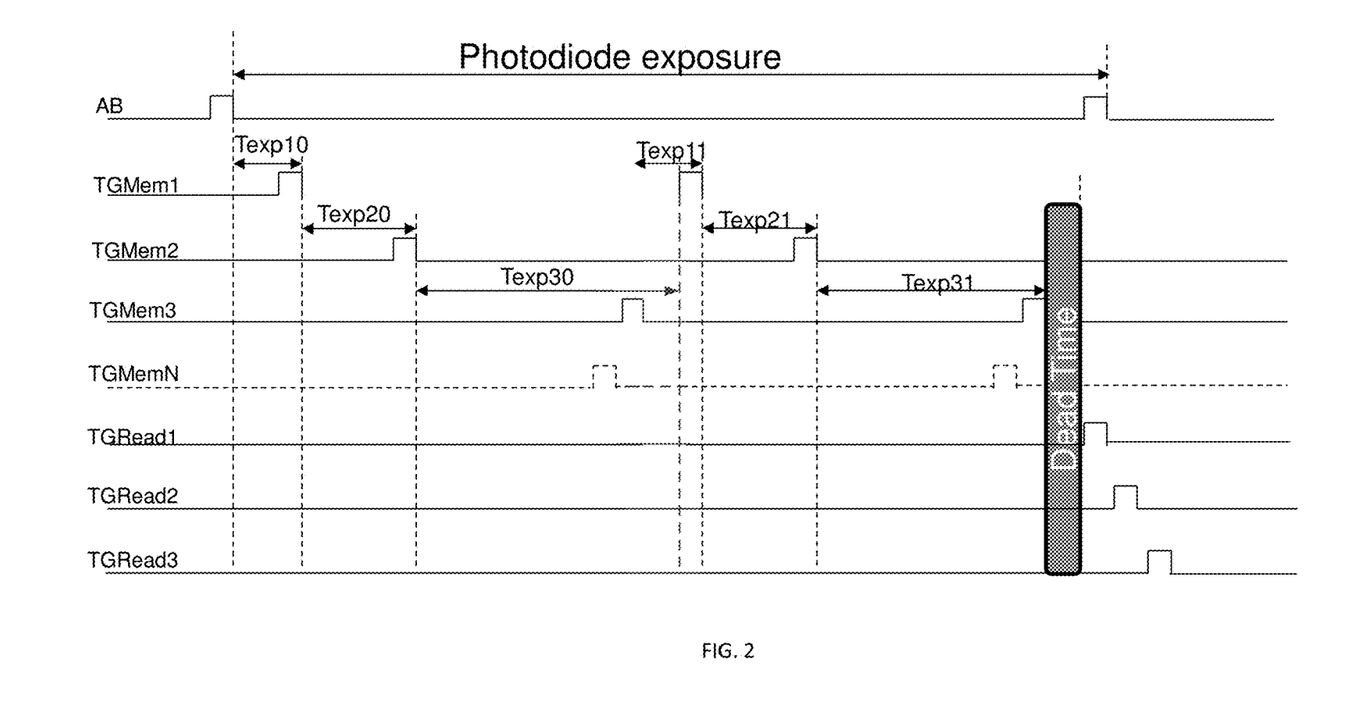
FIG. 2 is a timing diagram of the light sensing pixel of FIG. 1 in operation.
Figure 3:
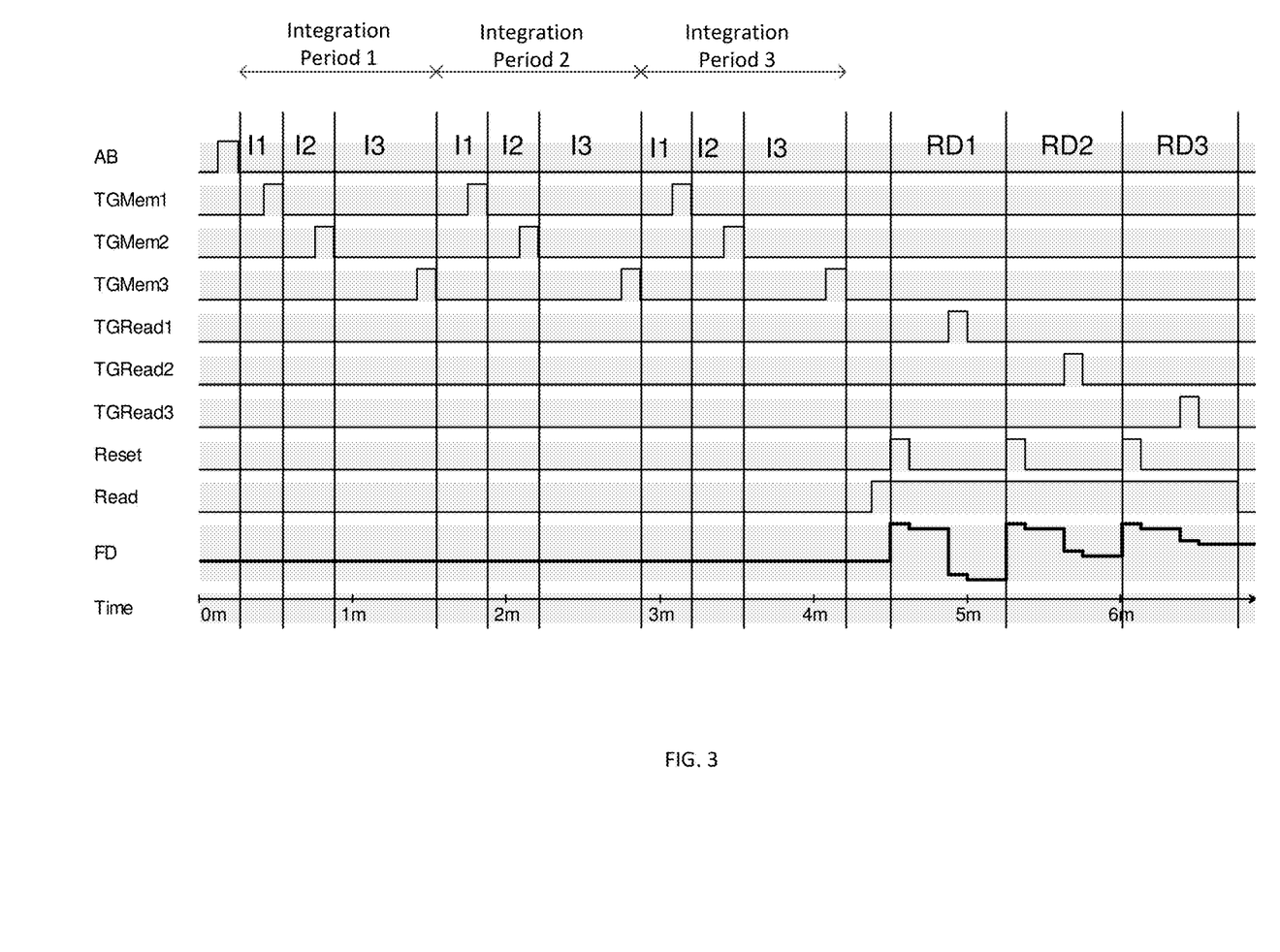
FIG. 3 is a more detailed timing diagram of the light sensing pixel of FIG. 1 in operation.

It should be noticed, viewing FIGS. 2 and 3, that within each integration period, each successive integration sub-period is greater than its predecessor in duration. Thus, integration sub-period I3 is greater in width than integration sub-period I2, which is in turn greater in width than integration sub-period I1. The purpose of the successively increasing integration sub-periods is to provide for a range of different exposure times from short to low so as to account for the high light and low light portions of the image captured.

Each of the sample/hold signals TGMem1-TGmemN is pulsed once per integration period, and each during a separate integration sub-period. As an example, in the operation shown in FIG. 3, during the I1 integration sub-period of each integration period, TGMem1 is pulsed. Similarly, during the I2 integration sub-period of each integration period, TGMem2 is pulsed, and during the I3 (or IN) integration sub-period of each integration period, TGMem3 (or TGMemN) is pulsed. This sequence will be repeated multiple times within the total Photodiode exposure period.

Each time TGMem1 is pulsed, charge fully transferred, between the pinned diode PPD and memory capacitor MEM1. Thus, memory capacitor MEM1 acquires more charge during each integration period after reset of the phododiode AB and before a subsequent reset of the phododiode AB. Likewise, each time TGMem2 is pulsed, charge is transferred, between the diode PPD and memory capacitor MEM2, and each time TGMem3 (or TGMemN) is pulsed, charge is transferred, between the diode PPD and memory capacitor MEMN.

Thus, by the end of the exposure period, memory capacitors MEM1-MEMN are charged with values representing image data. Subsequently, during a number of readout periods matching the number of storage nodes (here, RD1-RD3), each memory capacitor MEM1-MEMN is subsequently read out.

The readout is accomplished by asserting the read signal READ without interruption during all read periods. At the beginning of each read period, the reset signal RESET is pulsed, which causes reset transistor Qres1 to charge up the floating diffusion capacitor FD. Since at this point transistor Qres1 is off and transistor Qrd1 is on, a first read of the FD can be performed after reset and before pulsing TGRead1 to avoid noise. Once the reset signal RESET pulse is complete, the first read control signal TGRead1 is pulsed, turning on transistor Qr1. Charge is shared between memory capacitor MEM1 and the floating diffusion capacitor FD in order to perform a correlated double sampling. Transistor Qsf1, which is a source follower, transfers the voltage on the diffusion capacitor FD to node N4, and transistor Qrd1 then transfers the voltage to the column at node N7. At this point, additional circuitry reads the voltage from node N7 and performs post processing or analysis on the voltage.

This proceeds for each readout transistor. Thus, next, the reset signal RESET is pulsed again, and the next read control signal TGRead2 is pulsed, turning on transistor Qr2, resulting in charge being shared between memory capacitor MEM2 and the floating diffusion capacitor FD, the voltage of which is ultimately transferred to node N7. Thereafter, the reset signal RESET is pulsed again, and the next read control signal TGRead2 (TGReadN) is pulsed, turning on transistor QrN, resulting in charge being shared between memory capacitor MEMN and the floating diffusion capacitor FD, the voltage of which is ultimately transferred to node N7.

Shown in FIG. 2 are the dead zone times during which the photodiode PD is still detecting incoming photons, but integration is not being performed. Instead, the charge collected during the dead zone is purged through pulsing the AB control.

Figure 4:
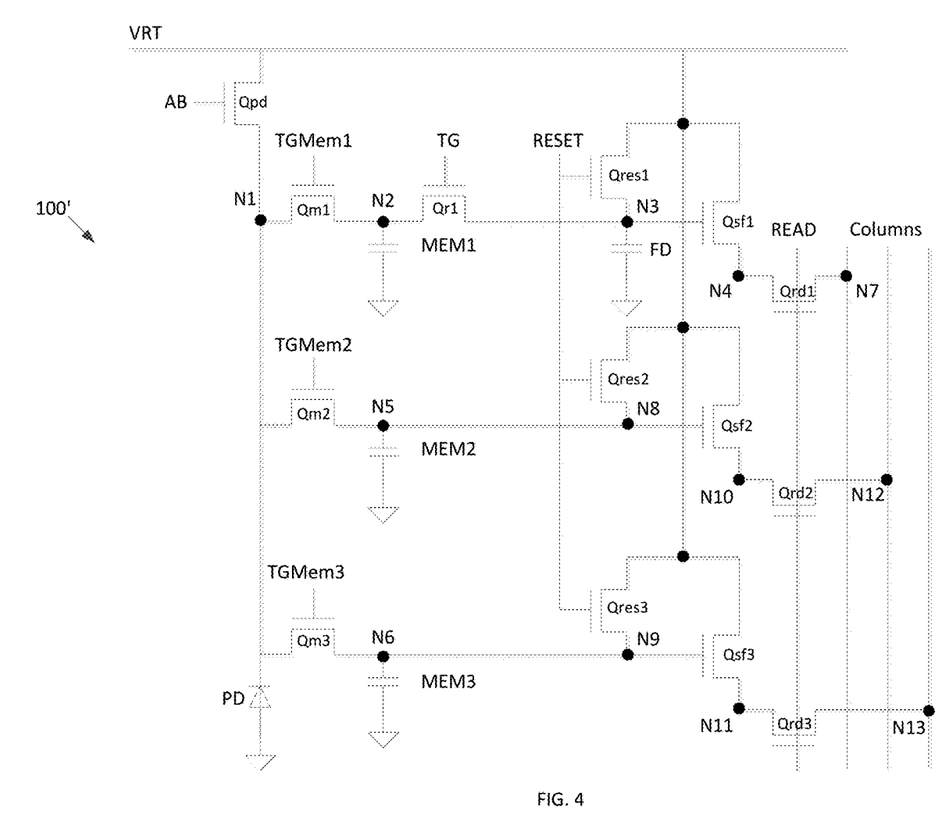
FIG. 4 is a schematic diagram of a different embodiment of a light sensing pixel in accordance with this disclosure.

A different embodiment of the light sensing pixel 100' is now described with reference to FIG. 4. Here, it should be noted that there is but one transfer gate transistor Qr1, and that sample transistors Qr2 and Qr3 to not have transfer gate counterparts Qm2 or Qm3. Instead, here there is a floating diffusion reset transistor counterpart to each sample transistor. Thus, floating diffusion reset transistor Qres2 has its drain coupled to the power supply node VRT, its source coupled to node N5, and its gate coupled to the reset signal RESET. Similarly, floating diffusion reset transistor Qres3 has its drain coupled to the power supply node VRT, its source coupled to node N6, and its gate coupled to the reset signal RESET.

Additionally, here there is also a source follower transistor and readout transistor counterpart to each sample transistor. Thus, source follower transistor Qsf2 has its drain coupled to power supply node VRT, its source coupled to node N10, and its gate coupled to node N5. Source follower transistor Qsf3 has its drain coupled to power supply node VRT, its source coupled to node N11, and its gate coupled to node N6.

Readout transistor Qrd2 has its drain coupled to node N10 its source coupled to a second column at node N12 and its gate coupled the read signal READ. Redout transistor Qrd3 has its drain coupled to node N11, its source coupled to a third column at node N13, and its gate coupled to the reads signal READ.

Figure 5:
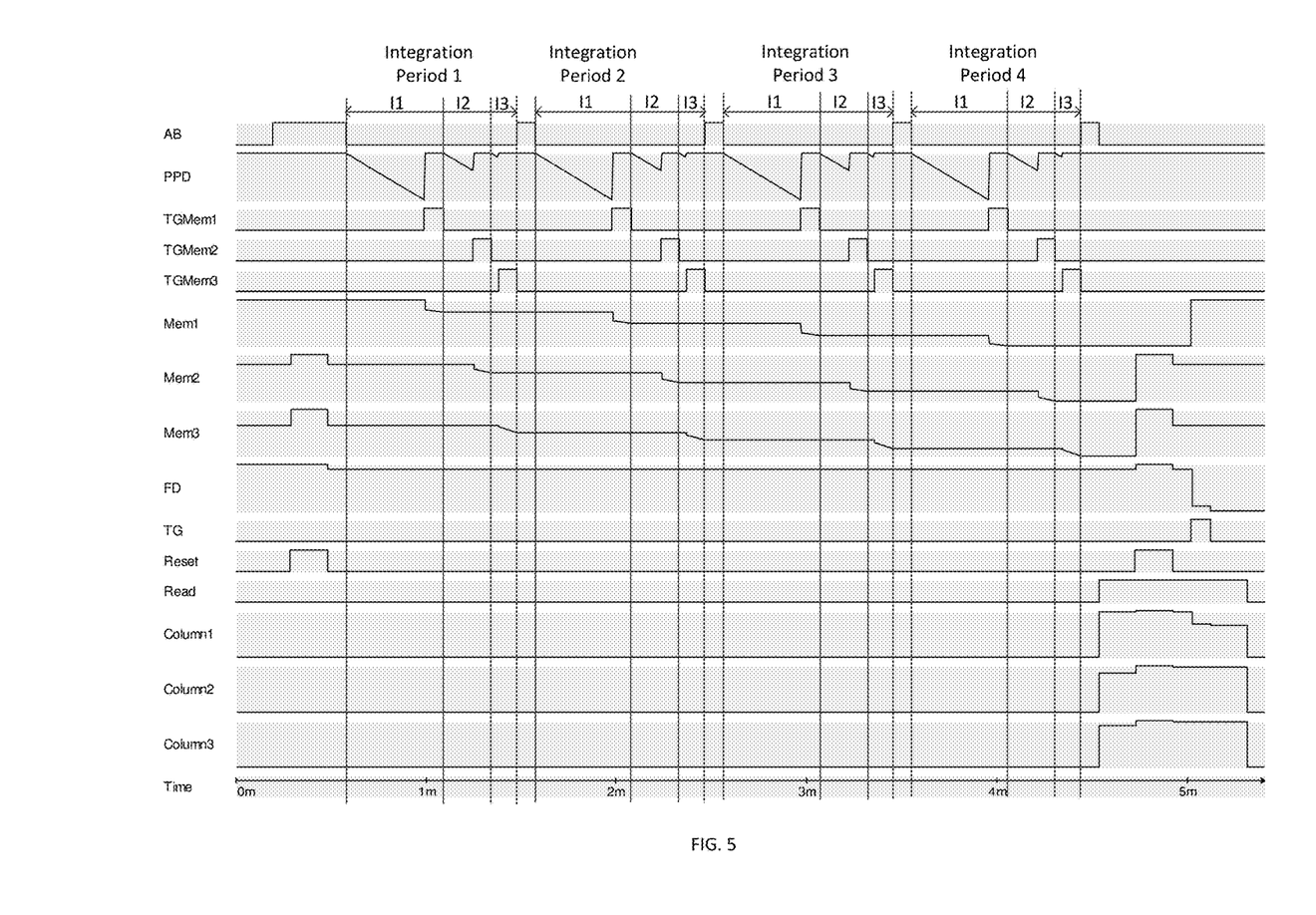
FIG. 5 is a timing diagram of the light sensing pixel of FIG. 4 in operation.

Operation of this embodiment will now be described with further reference to FIG. 5. Here, the photodiode PD is reset via the photodiode reset signal AB between each integration period. Thus, in operation, first reset signal AB is asserted, turning on transistor Qpd, pulling photodiode PD high, and allowing it to begin detection of incoming photons. Then the reset signal RESET is asserted, turning on reset transistors Qres1-Qres2, charging diffusion capacitor FD, as well as charging memory capacitors MEM2 and MEM3. The voltage at the photodiode PD, as shown in FIG. 5, decreases until TGMem1 is asserted during I1, at which point charge is transferred between the photodiode PD and memory capacitor MEM1, pulling the voltage at the photodiode PD high. When TGMem2 is asserted during I2, charge is shared between the photodiode PD and memory capacitor MEM2, pulling the voltage at photodiode PD high once again. When TGMem3 is asserted during I3, charge is shared between the photodiode PD and memory capacitor MEM3, pulling the voltage at photodiode PD high yet again. As can be seen from the voltages at the memory capacitors MEM1-MEM3 in FIG. 5, each successive share of charge results in a voltage decrease. Next, the photodiode PD is reset by photodiode reset signal AB, and the next integration period begins. After the given number of integration periods has passed (which in this case is four integration periods), the read signal READ is held asserted, and the read signal TG is pulsed. At the pulse of read signal TG, the voltage across memory capacitor MEM1 is transferred to node N3, and is in turn passed to node N7 at the first column by transistors Qsf1 and Qrd1. The voltage across memory capacitors MEM1-MEM2 has already been transferred via their source follower transistors Qsf2, Qsf3 and readout transistors Qrd2, Qrd3 to node N10 and N11, respectively at the second and third columns.

The circuits presented above provide for accurate detection of LED lighting via the different integration periods and sub-periods. Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. An electronic device, comprising:
   a photodiode;
   a plurality of storage components, wherein each storage component is configured to:
      independently sample and hold charges from the photodiode during each of a plurality of integration periods without discharging the held charge between successive integration periods of the plurality of integration periods;
   wherein each storage component accumulates charges from the photodiode for a given time window during each integration period, with the given time window for each storage component being different than the given time window for each other storage component; and
   readout circuitry configured to:
      transfer the accumulated charges from each storage component to a readout node in a respective read period for that storage component;
   wherein the photodiode and storage components are not configured to be reset between successive time windows during each integration period.

2. The electronic device of claim 1, wherein the photodiode is pinned.

3. The electronic device of claim 1, wherein the photodiode is configured to be reset between successive integration periods.

4. The electronic device of claim 1, wherein the photodiode is not configured to be reset between successive integration periods.

5. The electronic device of claim 1, wherein each read period is one of a plurality of different read periods.

6. The electronic device of claim 1, wherein each read period occurs simultaneously.

7. The electronic device of claim 1, wherein the readout circuitry is configured to reset the readout node between successive read periods.

8. The electronic device of claim 1, wherein, within each integration period, each time window is greater than each preceding time widow.

9. The electronic device of claim 1, wherein the photodiode has an anode coupled to a reference node and a cathode coupled to a first node; and further comprising a photodiode reset transistor having a drain coupled to a power supply node, a source coupled to the first node, and a gate coupled to receive a photodiode reset signal.

10. The electronic device of claim 9, wherein each of the plurality of storage components comprises a transistor having a source coupled to the first node, a drain coupled to an intermediate node for that storage component and a gate coupled to receive a sample/hold control signal for that storage component, and a storage element coupled between the intermediate node and the reference node; and wherein the sample/hold signal is asserted during each given time window during each integration period.

11. The electronic device of claim 10, wherein the readout circuitry comprises:

for each storage component, a respective transfer gate transistor having a drain coupled to the intermediate node, a source coupled to a sensing node for the readout circuitry, and a gate coupled to receive a read control signal for that storage component;

a reset transistor having a drain coupled to the power supply node, a source coupled to the sensing node, and a gate coupled to receive a reset signal; and a sense capacitor coupled between the sensing node and the reference node; and wherein the read control signal is uninterruptedly asserted during each read period;

wherein the reset signal is asserted at a beginning of each read period.

12. The electronic device of claim 11, wherein the readout circuitry further comprises:

a source follower transistor having a drain coupled to the power supply node, a source coupled to a follower node, and a gate coupled to the sensing node; and a read transistor having a drain coupled to the follower node, a source coupled to a read node, and a gate coupled to receive a read signal.

13. The electronic device of claim 10, wherein the readout circuitry comprises:

a transfer gate transistor having a drain coupled to the intermediate node of a first storage component of the plurality thereof, a source coupled to a sensing node, and a gate coupled to receive a read control signal;

a sense capacitor coupled between the sensing node and the reference node;

for the first storage component, a reset transistor having a drain coupled to the power supply node, a source coupled to the sensing node, and a gate coupled to receive the reset signal;

for other storage components of the plurality thereof, a reset transistor having a drain coupled to the power supply node, a source coupled to the intermediate node, and a gate coupled to receive the reset signal;

wherein each read period occurs simultaneously.

14. The electronic device of claim 13, wherein the readout circuitry further comprises:

for the first storage component:
a source follower transistor having a drain coupled to the power supply node, a source coupled to a follower node, and a gate coupled to the sensing node; and
a read transistor having a drain coupled to the follower node, a source coupled to a read node, and a gate coupled to receive a read signal;

for other storage components of the plurality thereof:
a source follower transistor having a drain coupled to the power supply node, a source coupled to a follower node, and a gate coupled to the intermediate node, and
a read transistor having a drain coupled to the follower node, a source coupled to a read node for that storage component, and a gate coupled to receive the read signal;

wherein the plurality of storage components are configured to be read out in parallel.

15. An electronic device, comprising:
a photodiode;
a first storage component configured to sample and hold charge from the photodiode during a first sample window of each of a plurality of integration periods;

a second storage component configured to sample and hold charge from the photodiode during a second sample window of each of the plurality of integration periods;

a third storage component configured to sample and hold charge from the photodiode during a third sample window of each of the plurality of integration periods;

wherein the first, second, and third sample windows are non-overlapping;

readout circuitry configured to:
transfer charge from the first storage component to a storage node during a first read period,
transfer charge from the second storage component to the storage node during a second read period,
transfer charge from the third storage component to the storage node during a third read period;

wherein the photodiode is not configured to be reset between the first, second, and third sample windows; and wherein the storage node is configured to be reset between each read period.

16. The electronic device of claim 15, wherein the third sample window is greater in duration than the second sample window which is greater in duration than the first sample window.

17. The electronic device of claim 15, wherein the photodiode is configured to be reset between successive integration periods.

18. The electronic device of claim 15, wherein the photodiode is not configured to be reset between successive integration periods.

19. The electronic device of claim 15, wherein each read period is one of a plurality of different read periods.

20. The electronic device of claim 15, wherein each read period occurs simultaneously.

21. An electronic device, comprising:
a photodiode having an anode coupled to a reference node and a cathode coupled to a first node;

a photodiode reset transistor having a drain coupled to a power supply node, a source coupled to the first node, and a gate coupled to receive a photodiode reset signal;

a first sample transistor having a source coupled to the first node, a drain coupled to a first intermediate node, and a gate coupled to receive a first sample/hold signal;

a second sample transistor having a source coupled to the first node, a drain coupled to a second intermediate node, and a gate coupled to receive a second sample/hold signal;

a third sample transistor having a source coupled to the first node, a drain coupled to a third intermediate node, and a gate coupled to receive a third sample/hold signal;

first, second, and third storage capacitors respectively coupled between the first, second, and third intermediate nodes and the reference node;

a first transfer gate transistor having a source coupled to the first intermediate node, a drain coupled to a sensing node, and a gate coupled to receive a first read control signal;

a first reset transistor having a drain coupled to the power supply node, a source coupled to the sensing node, and a gate coupled to receive a reset signal; and a first source follower transistor having a drain coupled to the power supply node, a source coupled to a first follower node, and a gate coupled to the sensing node;

a first read transistor having a drain coupled to the first follower node, a source coupled to a first column, and a gate coupled to receive a read signal.

22. The electronic device of claim 21, further comprising:
a second transfer gate transistor having a drain coupled to the second intermediate node, a source coupled to the sensing node, and a gate coupled to receive a second read control signal;
a third transfer gate transistor having a drain coupled to the third intermediate node, a source coupled to the sensing node, and a gate coupled to receive a third read control signal.

23. The electronic device of claim 21, further comprising:
a second reset transistor having a drain coupled to the power supply node, a source coupled to the second intermediate node, and a gate coupled to receive the reset signal;
a third reset transistor having a drain coupled to the power supply node, a source coupled to the third intermediate node, and a gate coupled to receive the reset signal;
a second source follower transistor having a drain coupled to the power supply node, a source coupled to a second follower node, and a gate coupled to the second intermediate node;
a third source follower transistor having a drain coupled to the power supply node, a source coupled to a third follower node, and a gate coupled to the third intermediate note;
a second read transistor having a drain coupled to the second follower node, a source coupled to a second column, and a gate coupled to receive the read signal; and
a third read transistor having a drain coupled to the third follower node, a source coupled to a third column, and a gate coupled to receive the read signal.

24. The electronic device of claim 21, wherein the first, second, and third storage capacitors comprise CDTI capacitors, such that the intermediate storage node stores charges and those charges are substantially entirely transferred to the sensing node.

25. The electronic device of claim 24 wherein the first transfer gate transistor is realized as a vertical transfer gate that transfers substantially all charge on the photodiode to the first, second, and third storage capacitors.

26. The electronic device of claim 25, wherein the vertical transfer gate comprises a CDTI transfer gate.

27. The electronic device of claim 21, wherein at least one of the first, second, and third storage capacitors comprise CDTI capacitors, such that the intermediate storage node stores charges and those charges are substantially entirely transferred to the sensing node; and at least one other of the first, second, and third storage capacitors comprise traditional capacitors, such that they store the charge and when connected to the sensing node, balance charge until they have a same voltage on their nodes.

28. The electronic device of claim 27 wherein the first transfer gate transistor is realized as a vertical transfer gate that transfers substantially all charge on the photodiode to ones of the first, second, and third storage capacitors that comprise CDTI capacitors.

29. The electronic device of claim 28, wherein the vertical transfer gate comprises a CDTI transfer gate.

30. A method, comprising:
allowing light to impinge upon a photodiode for an exposure period;
integrating a signal from the photodiode over multiple integration periods during the exposure period, with each integration period having a plurality of sub-periods;
sampling and holding the signal during each sub-period of each integration period over the exposure period, using a respective storage device for each sub-period; and
for each storage device, reading a charge associated with that storage device during a respective read period associated with that storage device, after passage of the multiple integration periods.

31. The method of claim 30, wherein each read period occurs simultaneously such that each storage device is read out in parallel.

32. The method of claim 30, further comprising transferring the signal from a given storage device to a floating diffusion capacitor prior to reading the voltage associated with that given storage device.

33. The method of claim 32, further comprising resetting the floating diffusion capacitor between each reading of the voltage.

* * * * *